United States Patent
Mammel

[11] Patent Number: 5,970,650
[45] Date of Patent: Oct. 26, 1999

[54] NO-THREAD FISHING EQUIPMENT

[76] Inventor: Allen Dean Mammel, 4642 N. Versailles, Dallas, Tex. 75209

[21] Appl. No.: 09/129,106

[22] Filed: Aug. 4, 1998

[51] Int. Cl.[6] .......................... A01K 91/04; A01K 83/00
[52] U.S. Cl. ........................................ 43/44.83; 43/43.16
[58] Field of Search ............................... 43/42.25, 43.16, 43/42.23, 42.49, 44.83, 44.8, 44.86

[56] References Cited

U.S. PATENT DOCUMENTS

| | | | |
|---|---|---|---|
| 86,154 | 1/1869 | Hiltz | 43/44.83 |
| 103,615 | 5/1870 | Muscroft | 43/43.16 |
| 319,655 | 6/1885 | Wright | 43/43.16 |
| 745,066 | 11/1903 | Koch | 43/43.16 |
| 805,284 | 11/1905 | Greenway et al. | 43/43.16 |
| 1,713,041 | 5/1929 | Fey | 43/44.86 |
| 1,961,378 | 6/1934 | Mitchell | 43/43.16 |
| 2,315,307 | 3/1943 | Wilson | 43/27 |
| 2,501,210 | 3/1950 | Cretin | 43/42.25 |
| 2,847,220 | 8/1958 | Heffron et al. | 43/44.83 |
| 2,898,701 | 8/1959 | Stinson | 43/44.86 |
| 2,962,834 | 12/1960 | Stinson | 43/43.16 |
| 3,878,637 | 4/1975 | Flower | 43/44.83 |
| 4,219,956 | 9/1980 | Hedman | 43/42.28 |
| 4,251,942 | 2/1981 | Jacobus | 43/44.8 |
| 4,773,181 | 9/1988 | Radden | 43/42.37 |
| 4,777,759 | 10/1988 | Wulff | 43/42.25 |
| 4,819,366 | 4/1989 | Manno | 43/44.81 |
| 4,905,403 | 3/1990 | Manno | 43/43.16 |
| 5,024,020 | 6/1991 | Sitton | 43/43.16 |
| 5,105,575 | 4/1992 | Robertaccio | 43/44.8 |
| 5,113,616 | 5/1992 | McManus | 76/44.83 |
| 5,237,772 | 8/1993 | Gibbs | 43/44.8 |
| 5,279,067 | 1/1994 | Tollison | 43/44.83 |

FOREIGN PATENT DOCUMENTS

| | | | |
|---|---|---|---|
| 1163804 | 3/1984 | Canada | 43/44.83 |
| 964991 | 8/1950 | France | 43/44.85 |
| 1014372 | 8/1957 | Germany | 43/43.16 |
| 2106151 | 8/1971 | Germany | 43/43.16 |
| 40/6022668 | 2/1994 | Japan | 43/43.16 |
| 72467 | 8/1947 | Netherlands . | |
| 413 | of 1866 | United Kingdom | 43/44.83 |
| 8560 | of 1889 | United Kingdom | 43/42.49 |
| 6339 | of 1892 | United Kingdom . | |
| 19600 | 10/1901 | United Kingdom | 43/44.83 |
| 26131 | 11/1903 | United Kingdom . | |
| 202923 | 8/1923 | United Kingdom | 43/42.25 |
| 930517 | 7/1963 | United Kingdom | 43/44.83 |
| 1013480 | 12/1965 | United Kingdom | 43/42.25 |
| 2030032 | 4/1980 | United Kingdom | 43/44.83 |

*Primary Examiner*—Thomas Price
*Assistant Examiner*—Fredrick T. French, III
*Attorney, Agent, or Firm*—Baker & Botts, L.L.P.

[57] ABSTRACT

A no-thread fishing fly includes an attractor attached to a fish hook, the fish hook having a hook disposed at one end of a shank and an eye disposed at an opposite end of the shank. The eye includes a distal end disposed adjacent to and spaced from the shank. The distal end of the eye includes an integrally formed blocker. In an alternate embodiment, a no-thread fishing lure includes an attractor disposed at one end of a shank and an eye disposed at an opposite end of the shank. The eye includes a distal end disposed adjacent to and spaced from the shank. The distal end of the eye includes an integrally formed blocker.

23 Claims, 2 Drawing Sheets

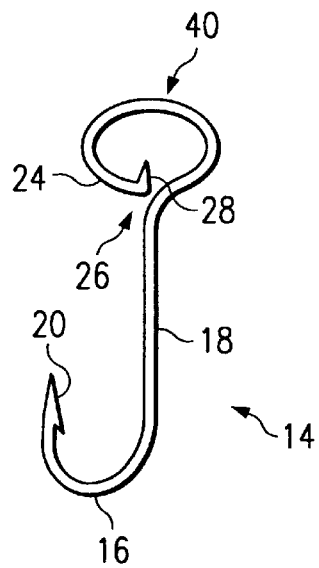 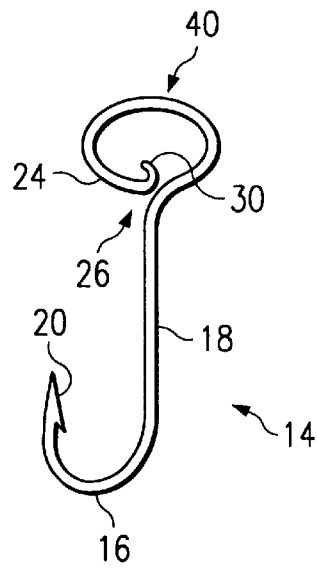 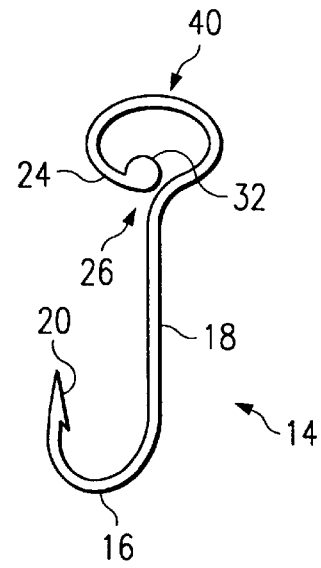
FIG. 4A        FIG. 4B        FIG. 4C
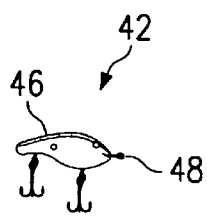 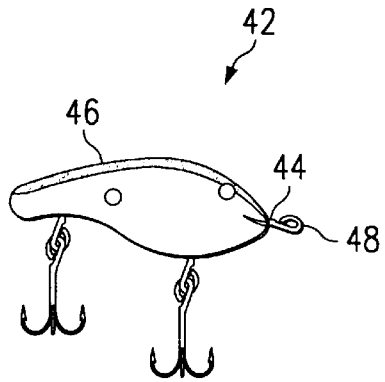
FIG. 5A        FIG. 5B
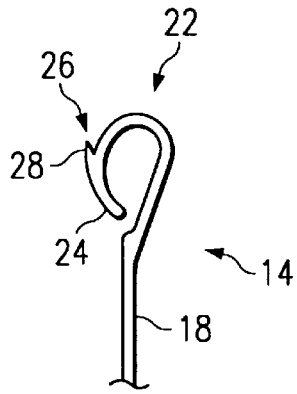 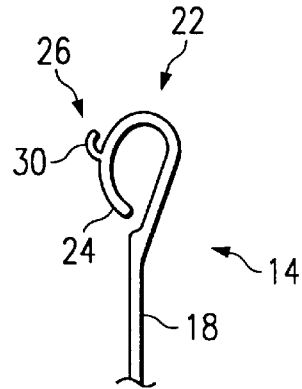 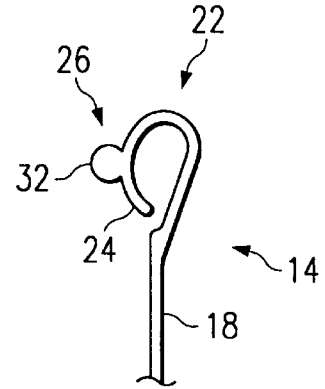
FIG. 6A        FIG. 6B        FIG. 6C

NO-THREAD FISHING EQUIPMENT

TECHNICAL FIELD OF THE INVENTION

This invention relates in general to fishing equipment and, more particularly, to a no-thread fishing fly or lure.

BACKGROUND OF THE INVENTION

Fishing equipment is available in a variety of sizes, shapes, colors and configurations for attracting and catching different species of fish. Several examples of fishing lures include spinner baits, jigs, and plastic worms. Another example of fishing equipment used to attract fish such as trout and bass is a fishing fly.

Fishing flies are generally constructed by tying colored materials, such as feathers, yarn, or hair, to a small fish hook so that the completed fishing fly resembles any one of a variety of species of insect that a particular species of fish feeds upon. Accordingly, the fish hooks used for constructing fishing flies are generally very small. For example, a size #18 fish hook for a fishing fly measures approximately 7 millimeters in length.

Fish hooks for constructing fishing flies generally include a J-shaped hook with a barb at one end of a shank for catching the fish and an eye at an opposite end of the shank for tying tippet, fishing line, leaders, or other materials so that the fishing fly can be cast and retrieved. Additionally, other fishing equipment and fishing lures, such as spinner baits and jigs, also include an eye at one end for attaching fishing line or leaders.

Fishing lures and fishing flies, however, suffer several disadvantages. For example, since fishing flies are generally constructed to resemble insects, the size of the fishing fly is generally very small. Accordingly, the fish hook and the eye of the fish hook are generally very small, thereby making it extremely difficult to thread tippet, fishing line, or leaders through the eye of the fish hook. With average or below average eyesight; poor lighting conditions; inclement weather; wind; a necessity to change the fly quickly; or stiff, cold or wet hands; the difficulty and problem of threading the eye of the fish hook is greatly magnified.

Additionally, the size of the eye generally determines the size of tippet, fishing line, or leader that may be used with the fishing fly or fishing lure. The smaller eyes of the fish hooks or fishing lures require smaller fishing line or tippet. Consequently, the fishing line or tippet material becomes smaller in diameter, more limp, more difficult to see, and increasingly difficult to handle. For example, a size #18 fly is approximately 7 millimeters in length, has a fish hook eye outside diameter of approximately 0.75 millimeters, a fish hook eye inside diameter of approximately 0.30 millimeters, and will generally accommodate fishing line or tippet material through the eye of the fish hook of approximately 0.13 millimeters or less. Thus, the flexibility of using a variety of sizes of fish hooks, lures, flies or other fishing devices with different diameter fishing line is limited.

SUMMARY OF INVENTION

Accordingly, a need has arisen for improved fishing equipment that provides greater ease and flexibility of use. The present invention provides no-thread fishing equipment that addresses shortcomings of prior fishing equipment.

According to one embodiment of the invention, a no-thread fishing fly having an attractor attached to a fish hook includes a fish hook having a hook disposed at one end of a shank and an eye disposed at a second end of the shank. The eye of the fish hook has a distal end disposed adjacent to and spaced from the shank. The distal end of the eye also includes an integrally formed blocker.

According to another embodiment of the invention, a fishing fly having an attractor attached to a fish hook includes a fish hook having a hook at a first end of a shank and an eye disposed at a second end of the shank. The eye of the fish hook includes a generally elongated oval configuration disposed transverse to the shank.

The invention provides several technical advantages. For example, in one embodiment of the invention, the no-thread fishing equipment provides for easier attachment of tippet, fishing line, or leaders than other fishing equipment. For example, fishing line may be slid into the eye of the fish hook of a fishing fly thereby alleviating a requirement of threading the fishing line through the eye of the fish hook. In the same embodiment, the fishing flies and lures provide greater flexibility than prior fishing flies and lures by allowing increased use of smaller fishing equipment with larger diameter fishing line.

Other technical advantages will be readily apparent to one skilled in the art from the following figures, descriptions, and claims.

BRIEF OF THE DRAWINGS

For a complete understanding of the present invention, and the advantages thereof, reference is now made to the following descriptions taken in connection with the accompanying drawings, in which:

FIG. 4A is an enlarged elevational view illustrating an alternate embodiment of a fish hook constructed in accordance with the present invention having a generally elongated oval eye with a blocker in the shape of a barb;

FIG. 4B is an enlarged elevational view illustrating an alternate embodiment of a fish hook constructed in accordance with the present invention having a generally elongated oval eye with a blocker in the shape of a loop;

FIG. 4C is an enlarged elevational view illustrating an alternate embodiment of a fish hook constructed in accordance with the present invention having a generally elongated oval eye with a blocker in the shape of a protrusion;

FIG. 5A is a schematic drawing in elevation illustrating a no-thread fishing lure constructed in accordance with the present invention;

FIG. 5B is an enlarged view of the no-thread fishing lure shown in FIG. 5A;

FIG. 6A is an enlarged elevational view illustrating an alternate embodiment of an eye for a fishing device constructed in accordance with the present invention having a blocker in the form of a barb;

FIG. 6B is an enlarged elevational view illustrating an alternate embodiment of an eye for a fishing device constructed in accordance with the present invention having a blocker in the form of a loop; and FIG. 6C is an enlarged elevational view illustrating an alternate embodiment of an eye for a fishing device constructed in accordance with the present invention having a blocker in the form of a protrusion.

DETAILED DESCRIPTION OF THE INVENTION

Embodiments of the present invention and its advantages are best understood by referring to FIGS. 1A through 6C of the drawings, like numerals being used for like and corresponding parts of the various drawings.

Figure 1A:
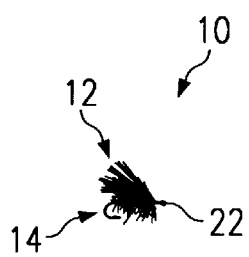
FIG. 1A is a schematic drawing in elevation showing a no-thread fishing fly constructed in accordance with the present invention.
Figure 1B:
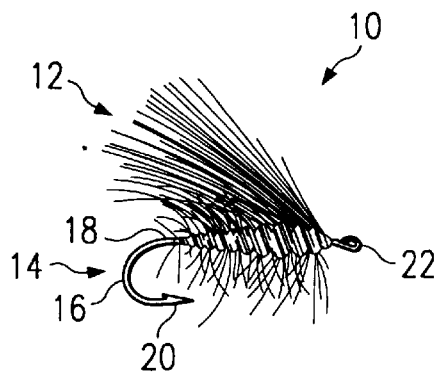
FIG. 1B is an enlarged view of the no-thread fishing fly shown in FIG. 1A.

FIG. 1A is a generally actual size elevational view illustrating one embodiment of a no-thread fishing fly 10 constructed in accordance with the present invention. FIG. 1B illustrates an enlarged view of fishing fly 10 shown in FIG. 1A. Fishing fly 10 includes an attractor 12 attached to a fish hook 14. Attractor 12 is attached to fish hook 14 so that fishing fly 10 generally resembles a species of insect that fish feed upon. Attractor 12 generally includes colored hair, feathers, yarn, or other materials for attracting different species of fish. Attractor 12 is attached to fish hook 14 using thread (not explicitly shown); however, other suitable materials or methods for attaching attractor 12 to fish hook 14 may be used.

Fish hook 14 of fishing fly 10 includes a J-shaped hook 16 disposed at one end of a shank 18. Hook 16 includes a barb 20 for preventing fish from ejecting fish hook 14 after being hooked. Fish hook 14 also includes an eye 22 disposed at an opposite end of shank 18. Eye 22 provides a location for attaching or tying a tippet, fishing line, or leader, hereinafter collectively referred to as "fishing line" (not explicitly shown), to fishing fly 10 so that fishing fly 10 can be cast and retrieved. For example, fishing line is generally attached to eye 22 by tying a knot (not explicitly shown) in the fishing line to eye 22. Although fish hook 14 is illustrated having a single J-shaped hook 16, other suitable shapes and configurations of hooks 16 may be used. For example, hook 16 may include a treble hook (not explicitly shown).

As best illustrated in FIG. 1A, eye 22 of fish hook 14 is generally very small, thereby making it extremely difficult to thread fishing line through eye 22 for attaching the fishing line to fish hook 14. For example, size #10, #16, and #18 fish hooks measure approximately 15 millimeters, 10 millimeters, and 7 millimeters, respectively, in length. Accordingly, eye 22 of fishing fly 10 will be described in greater detail in conjunction with FIGS. 2A through 2C to illustrate the increased flexibility of the present invention.

Figure 2A:
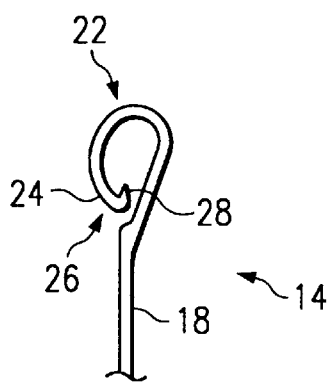
FIG. 2A is an enlarged elevational view illustrating an eye for a fishing device constructed in accordance with the present invention having a blocker in the form of a barb.

FIG. 2A is an enlarged drawing illustrating a portion of an embodiment of fish hook 14 of fishing fly 10. In the illustrated embodiment, fish hook 14 includes eye 22 disposed at one end of shank 18. Eye 22 includes a distal end 24 disposed adjacent shank 18 and spaced from shank 18. In operation, eye 22 of fish hook 14, having distal end 24 spaced from shank 18, allows fishing line to be slid into eye 22, wherein the fishing line may be tied to eye 22. For example, the fishing line may be physically manipulated to form a loop. The loop is slid along shank 18 and into eye 22 of fish hook 14, thereby alleviating a requirement of threading the fishing line through eye 22 of fish hook 14. After the loop has been slid into eye 22, the fishing line is tied to eye 22 so that fishing fly 10 may be cast and retrieved for catching fish.

Distal end 24 of eye 22 also includes a blocker 26 for preventing the fishing line attached to eye 22 of fish hook 14 from sliding off eye 22. In the embodiment illustrated in FIG. 2A, blocker 26 includes a barb 28. Thus, once the fishing line has been tied to eye 22, barb 28 prevents the tied fishing line from sliding off fish hook 14, thereby increasing the reliability of the engagement of fishing fly 10 with the associated fishing line.

Figure 2B:
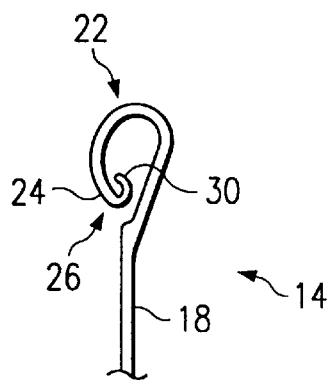
FIG. 2B is an enlarged elevational view illustrating an eye for a fishing device constructed in accordance with the present invention having a blocker in the form of a loop.

FIG. 2B is an enlarged drawing illustrating an alternate embodiment of fish hook 14 of fishing fly 10. In this embodiment, fish hook 14 includes eye 22 disposed at one end of shank 18. Eye 22 includes distal end 24 disposed adjacent to and spaced from shank 18. Distal end 24 of eye 22 includes blocker 26 for preventing fishing line attached to eye 22 from sliding off eye 22. In the illustrated embodiment, blocker 26 includes a loop 30 for preventing fishing line attached to eye 22 from sliding off eye 22.

Figure 2C:
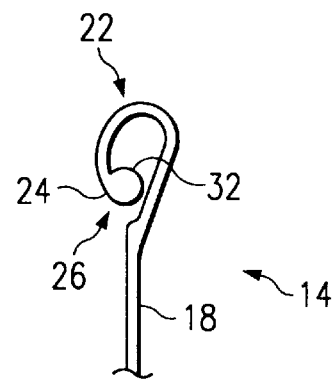
FIG. 2C is an enlarged elevational view illustrating an eye for a fishing device constructed in accordance with the present invention having a blocker in the form of a protrusion.

FIG. 2C is an enlarged drawing illustrating an alternate embodiment of fishing fly 10. In this embodiment, fish hook 14 includes eye 22 disposed at one end of shank 18. Eye 22 includes distal end 24 disposed adjacent to and spaced from shank 18. Distal end 24 of eye 22 includes blocker 26 for preventing fishing line attached to eye 22 from sliding off eye 22. In the illustrated embodiment, blocker 26 includes a protrusion 32 for preventing fishing line attached to eye 22 from sliding off eye 22.

Thus, fishing fly 10 provides greater flexibility than prior fishing flies by allowing fishing fly 10 to be constructed using smaller fish hooks 14. Additionally, fishing fly 10 provides greater flexibility than prior fishing flies by allowing fishing fly 10 to be used with an increased variety of fishing line sizes. For example, larger diameter fishing line may be slid into eye 22 of fishing fly 10, thereby alleviating a requirement to thread the larger diameter fishing line into eye 22. Additionally, fishing fly 10 provides increased reliability by preventing fishing line attached to eye 22 of fish hook 16 from sliding off eye 22.

Figure 3A:
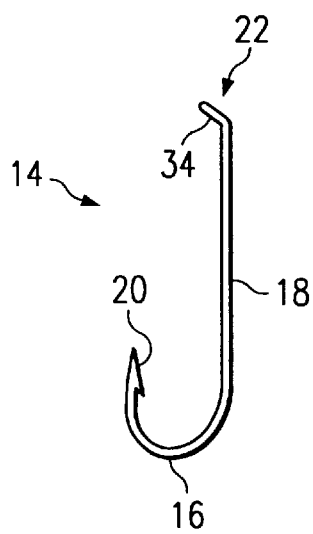
FIG. 3A is an enlarged elevational view illustrating a fish hook constructed in accordance with the present invention having a loop down eye.
Figure 3B:
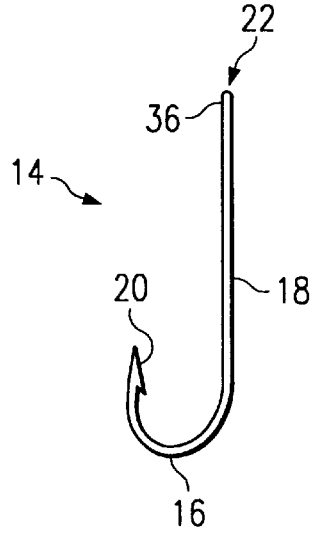
FIG. 3B is an enlarged elevational view illustrating a fish hook constructed in accordance with the preset invention having a straight eye.
Figure 3C:
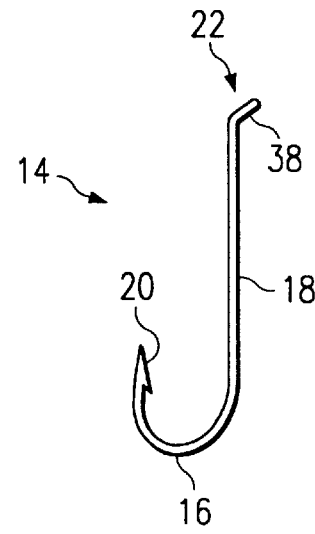
FIG. 3C is an enlarged elevational view illustrating a fish hook constructed in accordance with the present invention having a loop up eye.

FIGS. 3A through 3C are enlarged drawings illustrating alternate embodiments of fish hook 14 of fishing fly 10. FIG. 3A illustrates fish hook 14 having a hook 16 disposed at one end of shank 18 and eye 22 disposed at an opposite end of shank 18. In the embodiment illustrated in FIG. 3A, eye 22 includes a loop down eye 34. Loop down eye 34 allows fishing fly 10 to maintain a desired orientation in water during retrieval of fishing fly 10.

FIG. 3B illustrates fish hook 14 having hook 16 disposed at one end of shank 18 and eye 22 disposed at an opposite end of shank 18. In the embodiment illustrated in FIG. 3B, eye 22 includes a straight eye 36. Straight eye 36 of fish hook 14 allows fishing fly 10 to maintain a desired orientation in water during retrieval of fishing fly 10.

FIG. 3C illustrates fish hook 14 having hook 16 disposed at one end of shank 18 and eye 22 disposed at an opposite end of shank 18. In the embodiment illustrated in FIG. 3C, eye 22 includes a loop up eye 38. Loop up eye 38 allows fishing fly 10 to maintain a desired orientation in water during retrieval of fishing fly 10.

Thus, fishing fly 10 provides increased design flexibility by allowing a variety of eye 22 configurations to be used for fishing fly 10. For example, loop up eye 38 and loop down eye 34 allow fishing fly 10 to be manipulated in a desired orientation in water during retrieval while allowing easier interchangeability of fishing flies 10 than prior fishing flies.

FIG. 4A is an enlarged drawing illustrating an alternate embodiment of fish hook 14. In this embodiment, fish hook 14 includes hook 16 disposed at one end of shank 18 and a generally elongated oval eye 40 disposed at an opposite end of shank 18 and generally transverse to shank 18. Eye 40 of fish hook 14 includes distal end 24 disposed adjacent to and spaced apart from shank 18 thereby allowing fishing line to be slid into eye 40. Distal end 24 of eye 40 also includes blocker 26 for preventing fishing line attached to eye 40 from sliding off eye 40. In the embodiment illustrated in FIG. 4A, blocker 26 includes barb 28.

In operation, eye 40, having a generally elongated oval configuration transverse to shank 18, prevents fishing line attached to eye 40 from nearing distal end 24 of fish hook 14. Additionally, blocker 26 prevents fishing line attached to eye 40 of fish hook 14 from sliding off eye 40.

FIG. 4B is an enlarged drawing illustrating an alternate embodiment of fish hook 14. In this embodiment, fish hook 14 includes hook 16 disposed at one end of shank 18 and eye 40 disposed at an opposite end of shank 18. Eye 40 includes distal end 24 disposed adjacent to and spaced apart from shank 18 thereby allowing fishing line to be slid into eye 40. Distal end 24 of eye 40 also includes blocker 26 for preventing fishing line attached to eye 40 from sliding off eye 40. In the embodiment illustrated in FIG. 4B, blocker 26 includes loop 30.

FIG. 4C is an enlarged drawing illustrating an alternate embodiment of fish hook 14. In this embodiment, fish hook 14 includes hook 16 disposed at one end of shank 18 and eye 40 disposed at an opposite end of shank 18. Eye 40 includes distal end 24 disposed adjacent to and spaced apart from shank 18 thereby allowing fishing line to be slid into eye 40. Distal end 24 of eye 40 also includes blocker 26 for preventing fishing line attached to eye 40 from sliding off eye 40. In the embodiment illustrated in FIG. 4C, blocker 26 includes protrusion 32.

In operation, fishing line is slid into eye 40 of fish hook 14 thereby alleviating a requirement of threading the fishing line through eye 40. For example, the fishing line may be physically manipulated to form a loop. The loop of fishing line is slid along shank 18 and into eye 40. The fishing line is then tied to eye 40 so that fishing fly 10 may be cast and retrieved. Additionally, eye 40 of fish hook 14 prevents the fishing line from nearing distal end 24, thereby providing increased reliability of fishing fly 10. Thus, fishing fly 10 provides for quicker and easier interchangeability of fishing flies 10 by allowing fishing line to be quickly and easily attached to fishing flies 10.

FIG. 5A is a generally actual size elevational view illustrating one embodiment of a no-thread fishing lure 42 constructed in accordance with the present invention. FIG. 5B is an enlarged drawing of fishing lure 42 shown in FIG. 5A. Fishing lure 42 includes an attractor 44 disposed at one end of shank 18. In the embodiment illustrated, attractor 44 includes a one-piece body 46 for attracting fish while fishing lure 42 is retrieved through water; however, other suitable shapes and configurations of attractor 44 may be used.

Fishing lure 42 also includes an eye 48 disposed at an opposite end of shank 18. Eye 48 is generally constructed as eye 22 illustrated in FIGS. 2A through 2C having distal end 24 disposed adjacent to and spaced from shank 18 for allowing fishing line to be slid along shank 18 into eye 48. Additionally, eye 48 of fishing lure 42 includes blocker 26 for preventing fishing line from sliding off eye 22. As illustrated in FIGS. 2A through 2C, blocker 26 of fishing lure 42 may include barb 28, loop 30, protrusion 32, or other suitable shapes or configurations for preventing fishing line from sliding off eye 48.

In an alternate embodiment of fishing lure 42, eye 48 of fishing lure 42 is generally constructed having a generally elongated oval configuration disposed generally transverse to shank 18 as eye 40 illustrated in FIGS. 4A through 4C. Eye 48 of fishing lure 42, having a generally elongated oval configuration, prevents fishing line attached to eye 40 from nearing distal end 24 and sliding off eye 40. Additionally, eye 48 may include blocker 26 for preventing fishing line from nearing distal end 24 of eye 48. Blocker 26 of fishing lure 42 may include barb 28, loop 30, protrusion 32, or other suitable shapes or configurations for preventing fishing line from sliding off eye 48.

Therefore, the present invention provides for increased flexibility by providing easier and quicker interchangeability of fishing devices. For example, eye 22 or eye 40 can be used with a variety of fishing devices where ease of attaching fishing line is desired, such as fishing lures, fish hooks, jigs, swivels and the like. Additionally, the present invention provides greater flexibility by allowing increased diameter fishing line to be used with a variety of fishing devices.

FIGS. 6A through 6C are enlarged drawings of an alternate embodiment of eye 22 constructed in accordance with the teachings of the present invention. Referring to FIG. 6A, eye 22 includes distal end 24 disposed adjacent shank 18 and spaced from shank 18. Distal end 24 of eye 22 includes blocker 26 for preventing fishing line attached to eye 22 from sliding off eye 22. In the embodiment illustrated in FIG. 6A, blocker 26 extends outwardly from eye 22 and includes barb 28. Thus, blocker 26 may be located in a variety of locations and orientations on eye 22 to prevent fishing line attached to eye 22 from sliding off eye 22. Additionally, as illustrated in FIGS. 6B through 6C, blocker 26 may also include loop 30, protrusion 32, or other suitable shapes or configurations for preventing fishing line from sliding off eye 22.

Although the present invention and its advantages have been described in detail, it should be understood that various changes, substitutions, and alterations, can be made therein without departing from the sphere and scope of the present invention as defined by the appended claims.

What is claimed is:

1. A fish hook comprising:

a shank;

a hook disposed at a first end of the shank;

an eye having a generally circular configuration disposed at a second end of the shank;

the eye having a distal end disposed adjacent to and permanently spaced a selected distance from the shank to allow a fishing line to slide into the eye; and a blocker disposed on and forming an integral part of the eye to prevent the fishing line from sliding off the eye.

2. The hook of claim 1, wherein the eye comprises a blocker selected from the group consisting of a barb, a protrusion and a loop.

3. The hook of claim 1, wherein the fish hook comprises an eye selected from the group consisting of a loop up eye and a loop down eye.

4. A fish hook comprising:

a shank;

a hook disposed at a first end of the shank;

an eye disposed at a second end of the shank, the eye having a distal end permanently spaced from the shank to form a permanent gap which allows a fishing line to slide into the eye; and the eye having a generally elongated oval configuration disposed transverse to the shank.

5. The fly claim 4, wherein the eye further comprises a blocker formed as an integral portion of the eye adjacent to the distal end to prevent the fishing line from sliding off the eye.

6. The hook of claim 5, wherein the eye comprises a blocker selected from this group consisting of a barb, a loop and a protrusion.

7. The hook of claim 5, wherein the blocker comprises an interior portion of the eye.

8. The hook of claim 5, wherein the blocker comprises an exterior portion of the eye.

9. The hook of claim 4, wherein the fish hook comprises an eye selected from the group consisting of a loop up eye and a loop down eye.

10. A no-thread eye for a fishing device comprising:

a shank;

the eye having a generally circular configuration with a distal end disposed adjacent to and permanently spaced from the shank to allow a fishing line to slide into the eye; and an integrally formed blocker permanently disposed on an exterior portion of the eye proximate the distal end to prevent the fishing line from inadvertently sliding out of the eye.

11. The no-thread eye of claim 10, wherein the blocker is selected from the group consisting of a barb, a loop and a protrusion.

12. A no-thread fishing lure comprising:

a shank;

an attractor disposed at a first end of the shank;

an eye having a generally circular configuration disposed at a second end of the shank;

the eye having an end disposed adjacent to and permanently spaced from the shank to allow a fishing line to slide into the eye; and a blocker permanently disposed on and forming an integral part of the eye to prevent the fishing line from inadvertently sliding off the eye.

13. The fishing lure of claim 12, wherein the blocker is selected from the group consisting of a barb, a loop, and a protrusion.

14. The fishing lure of claim 12, wherein the eye further comprises an elongated oval disposed generally transverse to the shank.

15. A no-thread eye for a fishing device comprising:

a shank;

a distal end disposed adjacent to and permanently spaced from the shank to allow a fishing line to slide into the eye;

an integrally formed blocker permanently disposed on an interior portion of the eye proximate the distal end to prevent the fishing line from inadvertently sliding out of the eye; and the eye having a generally circular configuration with the eye and the blocker disposed on substantially the same plane.

16. The no-thread eye of claim 15, wherein the blocker is selected from the group consisting of a barb, a loop and a protrusion.

17. A no-thread fishing fly having an attractor attached to a fish hook, the fish hook comprising:

a shank;

a hook disposed at a first end of the shank;

an eye having a generally circular configuration disposed at a second end of the shank;

the eye having a distal end disposed adjacent to and permanently spaced from the shank;

a permanently formed gap disposed between the distal end of the eye and shank;

the gap sized to allow a fishing line to slide there through;

a blocker formed as an integral portion of the eye adjacent to the distal end to prevent the fishing line from sliding off the eye; and the distal end of the eye, the eye and the shank disposed in approximately the same plane.

18. The fly of claim 17, wherein the blocker comprises a barb.

19. The fly of claim 17, wherein the blocker comprises a loop.

20. The fly of claim 17, wherein the blocker comprises a protrusion.

21. The fly of claim 1, wherein the fish hook comprises the eye selected from the group consisting of a straight eye, a loop down eye or a loop up eye.

22. The fly of claim 17, wherein the eye further comprises an elongated oval disposed generally transverse to the shank.

23. The fly of claim 17, wherein the attractor comprises feathers tied to the fish hook.

* * * * *